US011785583B2

(12) United States Patent
Takeda et al.

(10) Patent No.: US 11,785,583 B2
(45) Date of Patent: Oct. 10, 2023

(54) TERMINAL, BASE STATION, METHOD, AND SYSTEM OF CONTROL FOR SCHEDULING AN UPLINK SHARED CHANNEL

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 85 days.

(21) Appl. No.: 16/969,473

(22) PCT Filed: Feb. 13, 2018

(86) PCT No.: PCT/JP2018/004910
§ 371 (c)(1),
(2) Date: Aug. 12, 2020

(87) PCT Pub. No.: WO2019/159235
PCT Pub. Date: Aug. 22, 2019

(65) Prior Publication Data
US 2021/0058903 A1    Feb. 25, 2021

(51) Int. Cl.
*H04W 72/04*    (2023.01)

(52) U.S. Cl.
CPC .................................. *H04W 72/04* (2013.01)

(58) Field of Classification Search
CPC ... H04W 72/04; H04W 72/12; H04W 72/042; H04W 72/044; H04W 72/0446; H04W 72/0453; H04W 16/00; H04W 36/06; H04B 7/024; H04L 1/0001; H04L 5/00
See application file for complete search history.

(56) References Cited

U.S. PATENT DOCUMENTS

2017/0111152 A1    4/2017   Blankenship et al.
2018/0049173 A1*   2/2018   Chen ..................... H04W 76/28
(Continued)

FOREIGN PATENT DOCUMENTS

WO    2016163942 A1    10/2016
WO    2017125022 A1    7/2017

OTHER PUBLICATIONS

International Search Report issued in PCT/JP2018/004910 dated May 1, 2018 (1 page).
(Continued)

*Primary Examiner* — Ian N Moore
*Assistant Examiner* — Brian T Le
(74) *Attorney, Agent, or Firm* — Osha Bergman Watanabe & Burton LLP

(57) ABSTRACT

To appropriately perform data transmission using a certain symbol, one aspect of a user terminal of the present disclosure includes: a transmitting section that transmits an uplink shared channel by using a certain number of symbols; and a control section that performs control such that transmission of the uplink shared channel using one symbol is performed when an allocation type allowing a change of a start position of the uplink shared channel is employed in a case that a plurality of allocation types for a time direction of the uplink shared channel are supported.

5 Claims, 10 Drawing Sheets

(56) References Cited

U.S. PATENT DOCUMENTS

2019/0029046 A1* 1/2019 Li .................. H04L 1/0003
2020/0351837 A1* 11/2020 Hwang ............ H04L 5/001

OTHER PUBLICATIONS

Written Opinion of the International Searching Authority issued in PCT/JP2018/004910 dated May 1, 2018 (3 pages).
Ericsson; "Link level evaluation of PUSCH for short TTI"; 3GPP TSG RAN WG1 Meeting #84, R1-160940; Malta, Feb. 15-19, 2016 (9 pages).
Qualcomm Incorporated; "UL Channel Design for Shortened TTI"; 3GPP TSG RAN WG1 #85, R1-164459; Nanjing, China; May 23-27, 2016 (8 pages).
Intel Corporation; "Uplink Reference Signal structure for sPUSCH transmissions"; 3GPP TSG-RAN WG1#88, R1-1702169; Athens, Greece; Feb. 13-17, 2017 (2 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010 (149 pages).
3GPP TSG RAN WG1 Meeting #88bis; R1-1705846 "Discussion on UL multiple starting and ending position for LAA" WILUS Inc.; Spokane, USA; Apr. 3-7, 2017 (2 pages).
Extended European Search Report issued in European Application No. 18906386.0, dated Aug. 19, 2021 (7 pages).
Office Action issued in the counterpart Japanese Patent Application No. 2019-571840, dated Apr. 12, 2022 (8 pages).
Office Action issued in Indian Application No. 202037037706; dated Aug. 1, 2022 (8 pages).
Office Action issued in European Application No. 18906386.0; dated Aug. 25, 2022 (5 pages).
Office Action issued in the counterpart Japanese Patent Application No. 2019-571840, dated Oct. 11, 2022 (6 pages).

* cited by examiner

FIG. 3A

| | DATA LENGTH (L) | START SYMBOL (S) |
|---|---|---|
| CANDIDATE #1 | 2 | Y1 |
| CANDIDATE #2 | 2 | Y2 |
| CANDIDATE #3 | 2 | Y3 |
| CANDIDATE #4 | 3 | Y1 |
| CANDIDATE #5 | 3 | Y2 |
| ... | ... | ... |

FIG. 3B

| | DATA LENGTH (L) | START SYMBOL (S) |
|---|---|---|
| CANDIDATE #1 | 1 | Y1 |
| CANDIDATE #2 | 1 | Y2 |
| CANDIDATE #3 | 2 | Y1 |
| CANDIDATE #4 | 2 | Y2 |
| CANDIDATE #5 | 3 | Y1 |
| ... | ... | ... |

TERMINAL, BASE STATION, METHOD, AND SYSTEM OF CONTROL FOR SCHEDULING AN UPLINK SHARED CHANNEL

TECHNICAL FIELD

The present invention relates to a user terminal (terminal) and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In the existing LTE systems (for example, LTE Rel. 8 to Rel. 13), communication of a downlink (DL) and/or an uplink (UL) is performed by using a subframe of 1 ms (also referred to as a transmission time interval (TTI) or the like). The subframe is a transmission time unit of one data packet coded by channel coding, and is a processing unit of scheduling, link adaptation, retransmission control (HARQ (Hybrid Automatic Repeat reQuest)), and so on.

A radio base station (for example, an eNB (eNode B)) controls allocation (scheduling) of data for a user terminal (UE (User Equipment)), and notifies the UE of a scheduling indication of data by using downlink control information (DCI). For example, when receiving DCI (also referred to as a UL grant) indicating UL transmission, the UE in compliance with existing LTE (for example, LTE Rel. 8 to Rel. 13) performs UL data transmission in a subframe after a certain period (for example, after 4 ms).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For the future radio communication systems (for example, NR), control of scheduling of data per certain period (for example, slot) is under study. Alternatively, control of scheduling of data per one or more symbols (for example, also referred to as mini-slot(s)) included in a slot is also under study.

For example, transmission of data per symbol (by using one symbol) is also assumed. At the same time, however, study as to how to control transmission (for example, allocation and so on) of data (for example, a physical shared channel) when transmission of the data using one symbol is performed is not yet adequately developed. If transmission using one symbol cannot be appropriately controlled, deterioration in communication quality may occur, for example.

In view of this, the present disclosure has one object to provide a user terminal and a radio communication method that can appropriately perform data transmission using a certain symbol.

Solution to Problem

A user terminal according to one aspect of the present disclosure includes: a transmitting section that transmits an uplink shared channel by using a certain number of symbols; and a control section that performs control such that transmission of the uplink shared channel using one symbol is performed when an allocation type allowing a change of a start position of the uplink shared channel is employed in a case that a plurality of allocation types for a time direction of the uplink shared channel are supported.

Advantageous Effects of Invention

According to the present invention, data transmission using a certain symbol can be appropriately performed.

BRIEF DESCRIPTION OF DRAWINGS

FIG. 3A and FIG. 3B are each a diagram to show an example of an SLIV table;

DESCRIPTION OF EMBODIMENTS

In the future radio communication systems (for example, LTE Rel. 14, Rel. 15 and later versions, 5G, NR, and so on; hereinafter also referred to as NR), transmission of data and so on by using slot-based scheduling and mini-slot-based scheduling is under study.

The slot is one of basic transmission units, and one slot is constituted with a certain number of symbols. For example, in a normal CP (CP), a slot period is constituted with a first number of symbols (for example, 14 symbols), whereas in an extended CP, a slot period is constituted with a second number of symbols (for example, 12 symbols).

The mini-slot corresponds to a period constituted with the number of symbols having a certain value (for example, 14 symbols (or 12 symbols)) or less. As an example, in DL transmission (for example, PDSCH transmission), the mini-slot may be constituted with a certain number (for example, 2, 4, or 7 symbols).

In slot-based scheduling (type A) and mini-slot-based scheduling (type B), different resource allocation schemes may be employed.

A case where slot-based scheduling (also referred to as PDSCH mapping type A) is employed in DL (for example, PDSCH transmission) is assumed. In this case, the PDSCH start position in a slot is selected from preconfigured candidate symbols, and the number of symbols allocated for the PDSCH (a PDSCH length) is selected from a range from a certain value (X) to 14. For example, a candidate symbol to be a candidate for the start position corresponds to a certain symbol index (for example, #0, #1, #2, or #3) within a slot.

A case where mini-slot-based scheduling (also referred to as PDSCH mapping type B) is employed in DL (for example, PDSCH transmission) is assumed. In this case, the number of symbols allocated for the PDSCH (a PDSCH length) is selected from the number of preconfigured candidate symbols, and the PDSCH start position in a slot is configured to any position (symbol) in a slot. For example, the number of candidate symbols of the PDSCH length corresponds to a certain number (2, 4, or 7 symbols). In other words, the PDSCH start position is flexibly configured.

A case where slot-based scheduling (also referred to as PUSCH mapping type A) is employed in UL (for example, PUSCH transmission) is assumed. In this case, the PUSCH start position in a slot is selected from preconfigured fixed symbols (for example, symbol index #0), and the number of symbols allocated for the PUSCH (a PUSCH length) is selected from a range from a certain value (Y) to 14 (see FIG. 1A).

Figure 1A:
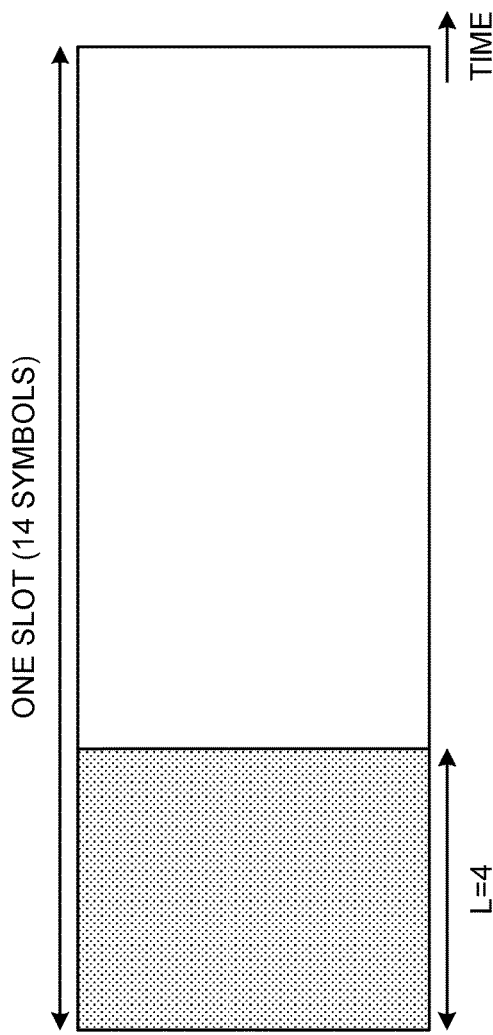
FIG. 1A and FIG. 1B are each a diagram to describe a PUSCH mapping type.

FIG. 1A shows a case where the PUSCH is allocated from the first symbol to the fourth symbol (symbols #0 to #3) of a slot. In this manner, in PUSCH mapping type A, the PUSCH start position is fixed, but the PUSCH length (here, L=4) is flexibly configured. Note that Y may be a value greater than 1 (Y>1), or may be equal to or greater than 1.

In type A, at least one of demodulation reference signals (DM-RSs) used for demodulation of the PUSCH may be mapped to a fixed symbol (for example, symbol #0 and so on). In type A, since the PUSCH is started from a fixed position, the position of at least one DM-RS may also be determined based on the PUSCH start position.

A case where mini-slot-based scheduling (also referred to as PUSCH mapping type B) is employed in UL (for example, PUSCH transmission) is assumed. In this case, the number of symbols allocated for the PUSCH (a PUSCH length) is selected from the number of preconfigured candidate symbols (1 to 14 symbols), and the PUSCH start position in a slot is configured to any position (symbol) in a slot (see FIG. 1B).

Figure 1B:
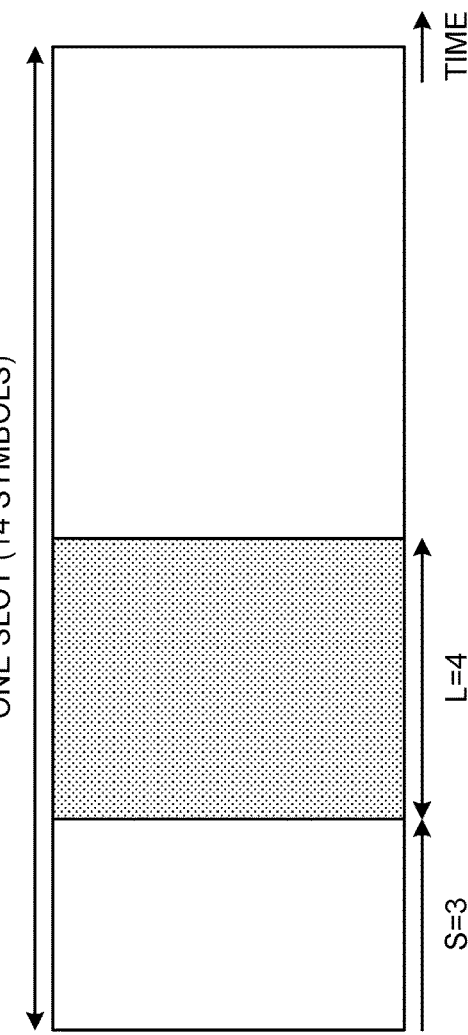

FIG. 1B shows a case where the PUSCH start symbol is a certain symbol (here, symbol #3 (S=3)), and the number of symbols consecutively allocated from the start symbol is 4 (L=4). In this manner, in PUSCH mapping type B, the PUSCH start symbol (S) and the number (L) of consecutive symbols from the start symbol are notified to a UE from a base station. The number (L) of consecutive symbols from the start symbol is also referred to as a PUSCH length. In this manner, in PUSCH mapping type B, the PUSCH start position is flexibly configured.

In type B, at least one of DMRSs used for demodulation of the PUSCH may be configured based on an allocation position of the PUSCH in a slot. The DMRS may be inserted in different positions, depending on a mapping type.

Information (S) indicating the start symbol of data (for example, a PUSCH) and information (L) indicating the length of the data (or information of a combination set of S and L) may be notified to a UE from a base station. In this case, the base station may configure a plurality of combination candidates (entries) of the start symbols (S) and the data lengths (L) for the UE in advance by using higher layer signaling, and may notify the UE of information indicating a specific candidate by using downlink control information. Note that, in type B, 105 combinations of PUSCH lengths and start positions are assumed.

Which mapping type is employed for the PDSCH/PUSCH (for example, information regarding allocation of an uplink shared channel) may be configured through higher layer signaling such as signaling for an RRC, may be notified through DCI, or may be recognized through a combination of the both.

In NR, transmission of data (for example, a physical shared channel) using one symbol is assumed. For example, in UL, PUSCH transmission per symbol is under study.

However, study as to how to control PUSCH transmission (for example, allocation of data and/or a DMRS and so on) when PUSCH transmission using one symbol is performed is not yet adequately developed. If transmission of a PUSCH and so on using one symbol cannot be appropriately controlled, deterioration in communication quality may occur, for example.

The inventors of the present invention have focused on PUSCH allocation types (for example, information regarding allocation of an uplink shared channel) when PUSCH transmission using one symbol is performed, and come up with the idea that PUSCH allocation per symbol can be flexibly configured by employing an allocation type (type B) in which a PUSCH start position (start symbol) can be flexibly configured, instead of employing an allocation type (type A) in which the PUSCH start position is fixedly configured.

The inventors of the present invention also have focused on waveforms employed in PUSCH transmission. In NR, for UL transmission (for example, PUSCH transmission), support of a DFT spread OFDM (DFT-s-OFDM (Discrete Fourier Transform-Spread-Orthogonal Frequency Division Multiplexing)) waveform being a single carrier waveform and a cyclic prefix OFDM (CP-OFDM (Cyclic Prefix-Orthogonal Frequency Division Multiplexing)) waveform being a multi-carrier waveform is assumed.

The DFT spread OFDM waveform may be expressed as a UL signal to which DFT spread (also referred to as DFT precoding and so on) is applied (with DFT-spreading) and so on, and the CP-OFDM waveform may be expressed as a UL signal to which DFT spread is not applied (without DFT-spreading) and so on.

The DFT spread OFDM waveform (hereinafter also referred to as a first waveform) is a single carrier waveform, and therefore increase of a peak to average power ratio (PAPR) can be prevented. When the DFT spread OFDM waveform is employed, uplink data (PUSCH) allocation is restricted to consecutive physical resource blocks (PRBs).

It is assumed that whether or not DFT spread is applied to UL transmission (for example, a PUSCH) (DFT spread OFDM waveform (hereinafter also referred to as a first waveform) or the CP-OFDM waveform (hereinafter also referred to as a second waveform)) is configured or indicated for a user terminal from a network (for example, a radio base station).

For example, the base station configures whether or not the first waveform is employed for the user terminal, by using higher layer signaling and/or downlink control information. Configuration of a waveform is also referred to as transform-precoding. When transform-precoding is "enabled", PUSCH transmission is performed by employing the first waveform (DFT spread OFDM waveform). On the other hand, when transform-precoding is "disabled", the UE performs PUSCH transmission without employing the first waveform (for example, employing the CP-OFDM waveform instead).

The inventors of the present invention have focused on the fact that there are a plurality of waveforms that may be employed for PUSCH transmission, and come up with the idea of performing PUSCH transmission using one symbol by using a certain waveform. For example, as one aspect of the present disclosure, the inventors come up with the idea of performing PUSCH transmission using one symbol when the first waveform is not employed (when transform-precoding is "disabled"). By adopting the configuration of not using the first waveform (DFT spread OFDM waveform) when PUSCH transmission using one symbol is performed, occurrence of deterioration in communication quality due to increase of a PAPR can be prevented even when UL data and a DMRS are frequency-multiplexed (FDM).

As another aspect of the present disclosure, the inventors of the present invention come up with the alternative idea of allowing PUSCH transmission using one symbol and not transmitting a DMRS in the PUSCH transmission also when the first waveform is employed (when transform-precoding is "enabled"). In this case, a DMRS used in UL transmission before the PUSCH transmission may be employed.

The inventors of the present invention come up with an alternative configuration of not performing UCI transmission using a PUSCH (UCI piggyback on PUSCH) when PUSCH transmission is performed by using one symbol. The inventors come up with the alternative idea of applying a restriction on types of signals to be multiplexed on a PUSCH when PUSCH transmission using one symbol is performed.

Embodiments according to the present invention will be described in detail with reference to the drawings as follows. A radio communication method according to each embodiment may be employed independently or may be employed in combination.

Note that, in the following embodiments, a prefix "NR-" indicating the meaning of "for NR" may be added to any signal and channel, so that the signal and channel may be interpreted as such meaning. Although the following description uses an example of transmission of UL data (PUSCH) in UL, the description may similarly apply to transmission of other signals (for example, DL data (PDSCH) in DL). The following embodiments may apply to transmission of a signal and/or a channel, other than data.

Although the following description uses an example of a case where PUSCH transmission using one symbol is employed in a case that PUSCH allocation type B is used, this is not restrictive. The description may similarly apply to a case where PUSCH allocation type A is used.

First Aspect

In a first aspect, PUSCH transmission using one symbol is employed in an allocation type (type B) in which a PUSCH start position can be flexibly configured, and when transform-precoding is "disabled".

PUSCH transmission using one symbol is configured (or scheduled) for the UE from the base station. For example, when the base station schedules a one-symbol PUSCH for the UE, the base station notifies of information related to a PUSCH start position (start symbol S) and a PUSCH length (L) by using downlink control information or the like (see FIG. 2).

Figure 2:
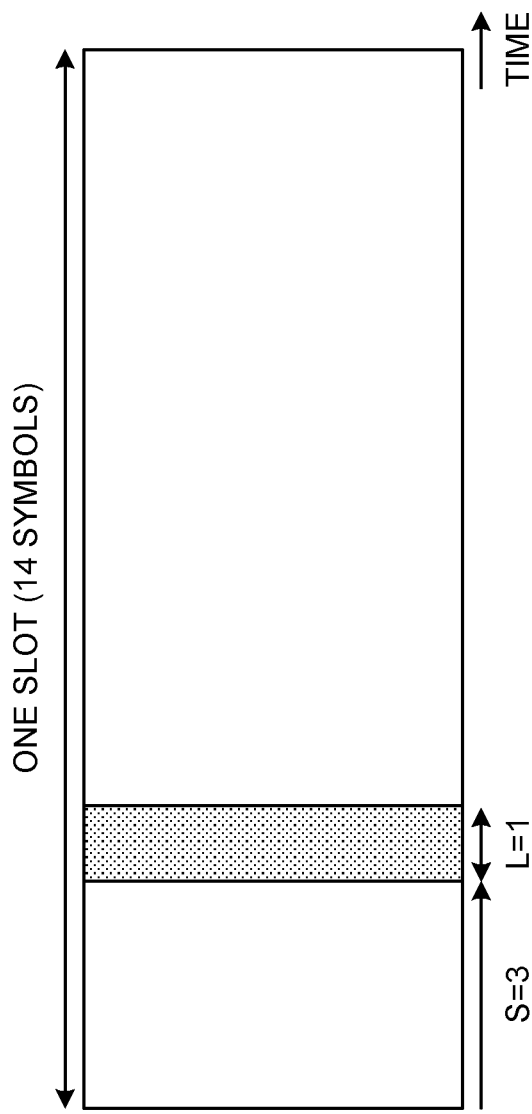
FIG. 2 is a diagram to show an example of PUSCH transmission using one symbol.

FIG. 2 shows a case where the PUSCH length is configured to 1 (L=1), and the start symbol is configured to a certain symbol (here, symbol #3) in a slot. Note that the start symbol of PUSCH transmission is not limited to the above, and another symbol may be indicated.

When the first waveform (DFT spread OFDM waveform) is configured (when transform-precoding is "enabled"), the UE may assume that PUSCH transmission using one symbol is not configured or scheduled. In other words, PUSCH transmission using one symbol may be restricted to a case where the first waveform is not configured (when transform-precoding is "disabled").

In this case, the UE performs PUSCH transmission per symbol by employing a waveform other than the first waveform (for example, the second waveform (CP-OFDM waveform)). The UE may frequency-multiplexes UL data and a demodulation reference signal (DMRS) in one symbol in which the PUSCH is transmitted.

By employing PUSCH transmission using one symbol when transform-precoding is "disabled" (for example, the CP-OFDM waveform) as described above, UL data and a DMRS can be frequency-multiplexed in one symbol. By employing allocation type B for PUSCH transmission using one symbol, an allocation position of the PUSCH can be flexibly configured.

<SLIV Table Configuration 1>

The UE may control PUSCH transmission by using a table (also referred to as an SLIV (Start and length indicator value) table or a PUSCH symbol allocation table), in which a plurality of combination candidates (entries) of the start symbols (S) and the data lengths (L) of the PUSCH are configured.

The SLIV table is defined with N rows. In each row, a combination candidate index, and a combination of the start symbol (S) and the data length (L) of the PUSCH indicated by the index are defined. When a combination candidate is configured by using higher layer signaling or the like, a row number of the SLIV table constituted with N rows only needs to be notified. Accordingly, 0 to N−1 indices are assigned to respective rows of the SLIV table, and one or a plurality of indices out of those can be configured for the user terminal by using RRC signaling and so on. The RRC signaling used for selection of one row out of N rows and notification of the selected row may be Ceiling (Log 2 (N)) bits.

For example, the base station may notify the UE of one or a plurality of combination candidates out of the above in advance by using higher layer signaling or the like. In this manner, the base station can indicate a specific candidate, by using downlink control information for scheduling the PUSCH.

In this case, each waveform employed for the PUSCH may have different table contents (for example, start symbols and/or symbol lengths configured in a table) (see FIGS. 3A and 3B). FIGS. 3A and 3B each show an example of a table in which a plurality of combination candidates of the data lengths (L) and the start symbols (S) are configured.

Although FIGS. 3A and 3B show only some of the data lengths (L) and the start symbols (S), another parameter and so on may be included.

For example, when the first waveform is employed for the PUSCH (when transform-precoding is "enabled"), PUSCH transmission using one symbol is not employed. Therefore, in a table (first table) for the case where transform-precoding is "enabled", candidates (entries) having the data length (PUSCH length) of one symbol may not be included (see FIG. 3A).

As an example, in the first table, candidates having the data length of two symbols or more are configured. In this manner, a larger number of candidates having the PUSCH length of two symbols or more can be configured in the table.

When the first waveform is not employed for the PUSCH (when transform-precoding is "disabled"), PUSCH transmission using one symbol is employed. Therefore, in a table (second table) for the case where transform-precoding is "disabled", at least one candidate (entry) having the PUSCH length of one symbol is included (see FIG. 3B).

As an example, in the second table, candidates having the PUSCH length of one symbol to 13 symbols are configured. In this manner, candidates (entries) that may be employed and that are adapted to PUSCH transmission can be configured in the table.

Note that the second table may be a table configured by changing a part of the contents of the first table. For example, the second table may be configured by changing at least one candidate that is defined in the first table and that has the PUSCH length of two symbols or more to a candidate (entry) having the PUSCH length of one symbol length. In this manner, when the second table is configured, only information different from the first table needs to be notified to the UE, and thus a notification amount for the UE can be reduced.

By individually configuring table contents depending on whether or not PUSCH transmission using one symbol is employed as described above, table contents can be flexibly configured depending on whether or not the PUSCH transmission is employed. In this manner, conditions for PUSCH transmission can be flexibly controlled.

<SLIV Table Configuration 2>

Waveforms employed for the PUSCH may have common table contents (for example, start symbols and/or symbol lengths configured in a table).

The UE uses a common table both when the first waveform is employed for the PUSCH (when transform-precoding is "enabled") and when the first waveform is not employed (when transform-precoding is "disabled").

In this case, respective candidates (entries) having the PUSCH length of one symbol to 14 symbols are defined, and the table is used irrespective of whether or not the first waveform is employed for the PUSCH (whether or not transform-precoding is "enabled").

When a common SLIV table is used irrespective of a waveform employed for the PUSCH, the number of rows of the table may be 64 or more, and the number of bits of RRC signaling for selecting and indicating a certain row from the table may be 7 bits or more.

When the first waveform is employed for the PUSCH (when transform-precoding is "enabled"), the UE may assume that a candidate (entry) having the PUSCH length of one symbol is not notified out of the SLIV table. When a candidate (entry) having the PUSCH length of one symbol is notified out of the SLIV table, the UE may assume that the first waveform (transform-precoding is "enabled") is not employed for the PUSCH.

Second Aspect

In a second aspect, PUSCH transmission using one symbol is employed in an allocation type (type B) in which a PUSCH start position can be flexibly configured, and when transform-precoding is "enabled" or "disabled".

In other words, in the second aspect, employment of PUSCH transmission using one symbol is supported, irrespective of a waveform employed for the PUSCH (irrespective of whether or not transform-precoding is "enabled").

PUSCH transmission using one symbol is configured (or scheduled) for the UE from the base station. For example, when the base station schedules a one-symbol PUSCH for the UE, the base station notifies of information related to a PUSCH start position (start symbol S) and a PUSCH length (L) by using higher layer signaling, downlink control information, and/or the like. For example, the PUSCH length is configured to 1 (L=1), and the start symbol (corresponding to a transmission symbol) is selected from any symbol in a slot.

A case where the first waveform is not configured (when transform-precoding is "disabled") is assumed. When PUSCH transmission using one symbol is scheduled, the UE frequency-multiplexes UL data and a DMRS, and performs PUSCH transmission. For example, the UE performs PUSCH transmission by employing a waveform other than the first waveform (for example, the second waveform (CP-OFDM waveform)). In this manner, increase of a PAPR can be prevented, and UL data and a DMRS can be appropriately transmitted by using one symbol.

In contrast, a case where the first waveform is configured (when transform-precoding is "enabled") is assumed. When PUSCH transmission using one symbol is scheduled, the UE performs PUSCH transmission without frequency multiplexing UL data and a DMRS (without multiplexing a DMRS), by using the DFT spread OFDM waveform.

In other words, when the first waveform is employed, a DMRS is not transmitted in PUSCH transmission using one symbol. In this manner, increase of a PAPR can be prevented with single carrier characteristics being maintained in UL transmission. Therefore, PUSCH transmission using one symbol can be appropriately performed.

To demodulate PUSCH transmission in which a DMRS is not transmitted, a DMRS transmitted before the PUSCH transmission (for example, the latest (the most recent) DMRS transmission) may be used. For example, the base station may perform a PUSCH receiving process using one symbol, by using a DMRS transmitted in PUSCH transmission (having the PUSCH length of two symbols or more) in a slot that is one or more slots before the PUSCH transmission (see FIG. 4).

Figure 4:
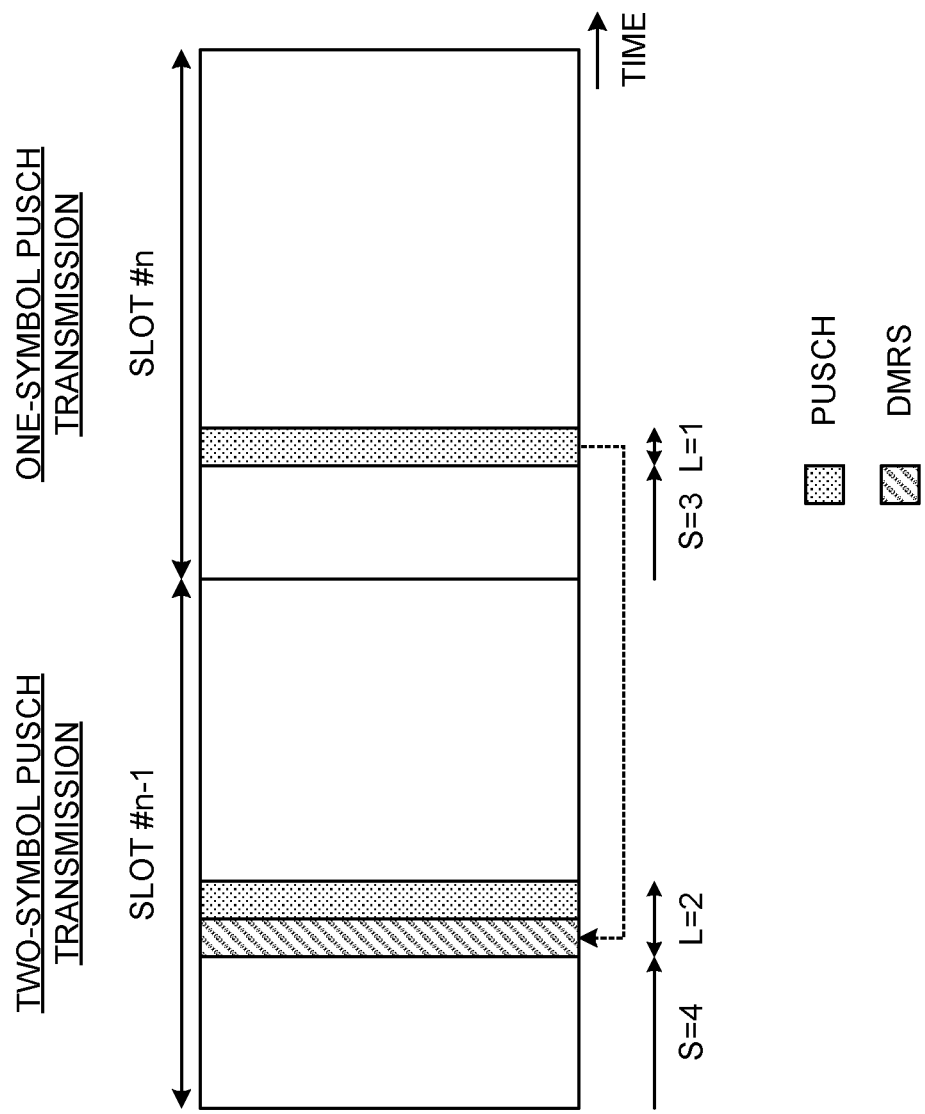
FIG. 4 is a diagram to show another example of PUSCH transmission using one symbol.

FIG. 4 shows a case where one-symbol PUSCH transmission employing the first waveform is performed in slot #n. Here, a case where PUSCH transmission using two symbols is performed in slot #n−1 that is one slot preceding slot #n is shown. In this case, the base station may perform a receiving process of one-symbol USCH transmission in slot #n (without DMRS transmission), by using a DMRS transmitted in slot #n−1.

When PUSCH transmission using one symbol is scheduled with the first waveform being configured (transform-precoding being "enabled"), the UE may employ certain conditions for the PUSCH transmission. As the certain conditions, conditions for certain PUSCH transmission transmitted before the PUSCH transmission using one symbol may be used.

As the certain PUSCH transmission, PUSCH transmission conditions when the first waveform is not configured (when transform-precoding is "disabled") may be employed. Alternatively, transmission conditions for PUSCH transmission using two symbols or more when the first waveform is configured (when transform-precoding is "enabled") may be employed.

For example, the UE directly employs at least one condition of transmit power, phase, and a transmission bandwidth (BW) of certain PUSCH transmission (the most recent PUSCH transmission (for example, PUSCH transmission in slot #n−1 of FIG. 4)) transmitted before PUSCH transmission using one symbol. In this manner, regarding PUSCH transmission using one symbol, the base station can perform channel estimation and so on appropriately in some degree, by using a DMRS transmitted simultaneously with a PUSCH before the PUSCH transmission.

By adopting the configuration of not transmitting a DMRS in PUSCH transmission using one symbol as described above, increase of a PAPR can be prevented even when one-symbol PUSCH transmission employing the first waveform is performed.

Third Aspect

In a third aspect, in PUSCH transmission using one symbol, transmission of uplink control information (UCI) using the PUSCH is restricted. In other words, in PUSCH transmission using one symbol, UCI on PUSCH (UCI piggyback on PUSCH) is not supported.

For example, control is performed such that PUSCH transmission using one symbol is not scheduled in a certain symbol (for example, the start symbol) of uplink control channel (PUCCH) transmission. In this case, the UE may assume that PUSCH transmission using one symbol is not scheduled in the start symbol of PUCCH transmission.

Alternatively, control may be performed such that PUSCH transmission is dropped if a certain symbol (for example, the start symbol) of PUCCH transmission and a symbol of PUSCH transmission using one symbol are at the same timing. In this case, the UE drops PUSCH transmission and performs PUCCH transmission, if scheduling timing of PUSCH transmission using one symbol is the same as that of a certain symbol (for example, the start symbol) of the PUCCH. In this manner, PUCCH transmission can be preferentially transmitted.

Alternatively, control may be performed such that PUCCH transmission is dropped if a certain symbol (for example, the start symbol) of PUCCH transmission and a symbol of PUSCH transmission using one symbol are at the same timing. In this case, the UE drops PUCCH transmission and performs PUSCH transmission, if scheduling timing of PUSCH transmission using one symbol is the same as that of a certain symbol (for example, the start symbol) of the PUCCH. In this manner, PUSCH transmission can be preferentially transmitted.

In PUSCH transmission using one symbol, the UE may assume that a value of a UL DAI included in a UL grant is a fixed value (for example, 0), or may ignore the value. This can eliminate the necessity of transmission control depending on a value of a UL DAI, and therefore a terminal processing load can be reduced. In addition, by fixing a value of a UL DAI, the UL DAI can be used as known bits, and therefore reception performance can be improved.

Fourth Aspect

In a fourth aspect, in PUSCH transmission using one symbol, transmission of uplink control information (UCI) using the PUSCH is performed, without multiplexing UL data (for example, a UL-SCH). In other words, in PUSCH transmission using one symbol, when UCI on PUSCH (UCI piggyback on PUSCH) is performed, only UCI is multiplexed, without multiplexing UL data.

When PUSCH transmission using one symbol is performed, the UE transmits certain uplink control information by using the PUSCH. For example, the UE multiplexes, on the PUSCH using one symbol, channel state information (for example, aperiodic CSI (A-CIS) and/or semi-persistent CSI (SP-CSI)) and transmits the result of the multiplexing. In this case, the UE may perform transmission without multiplexing UL data.

In PUSCH transmission using one symbol, the UE may be given an indication as to whether UL data is to be transmitted in the one-symbol PUSCH, or whether only UCI is to be multiplexed without multiplexing UL data, depending on a value of a UL DAI included in a UL grant.

By multiplexing one of UCI and UL data and transmitting the result of the multiplexing when PUSCH transmission using one symbol is performed as described above, reduction in communication quality can be prevented.

Radio Communication System

Hereinafter, a structure of a radio communication system according to one embodiment of the present invention will be described. In this radio communication system, the radio communication method according to each embodiment of the present invention described above may be used alone or may be used in combination for communication.

Figure 5:
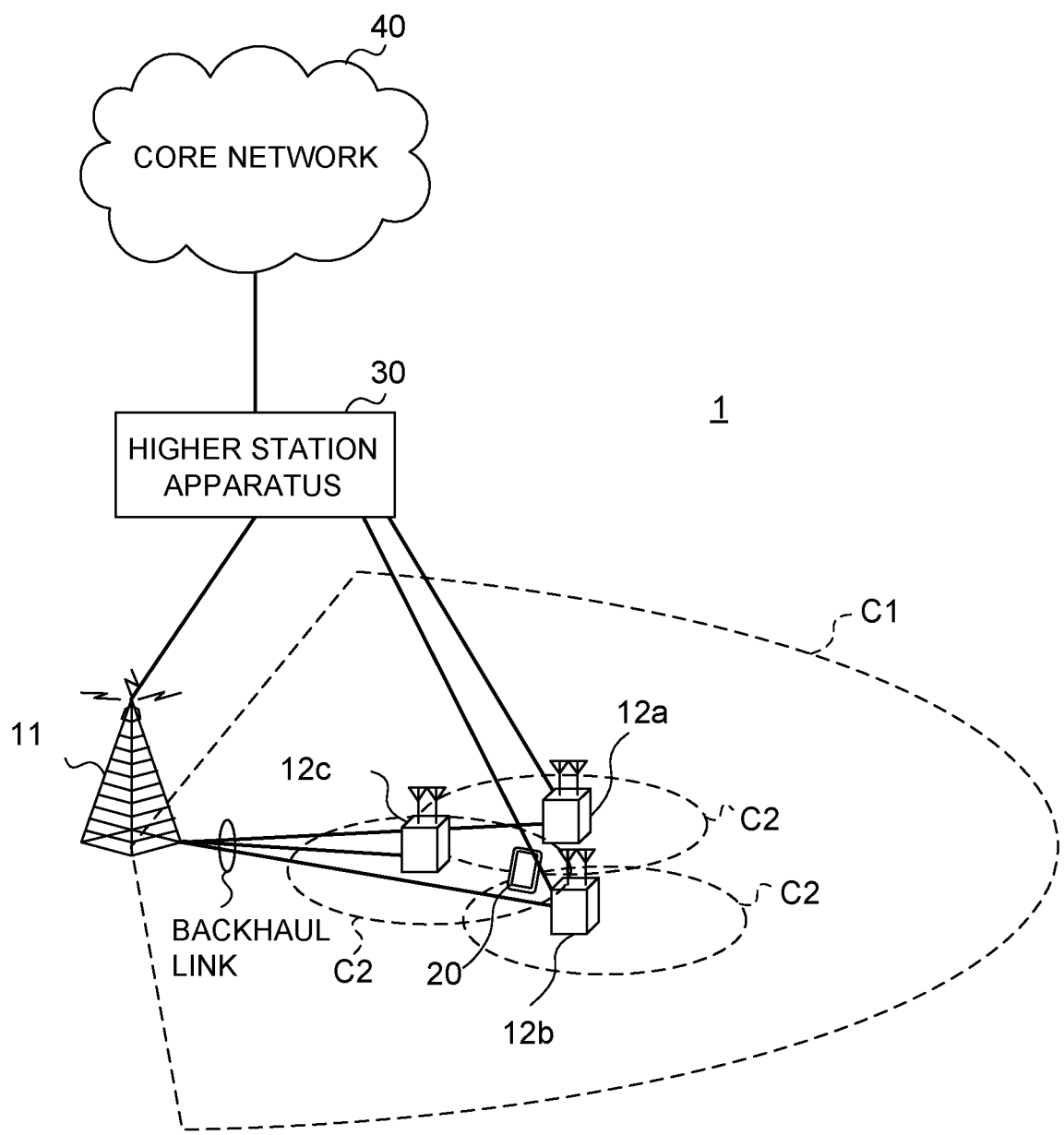
FIG. 5 is a diagram to show an example of a schematic structure of a radio communication system according to one embodiment of the present invention.

FIG. 5 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Delivery confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, delivery confirmation information, a scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

Radio Base Station

Figure 6:
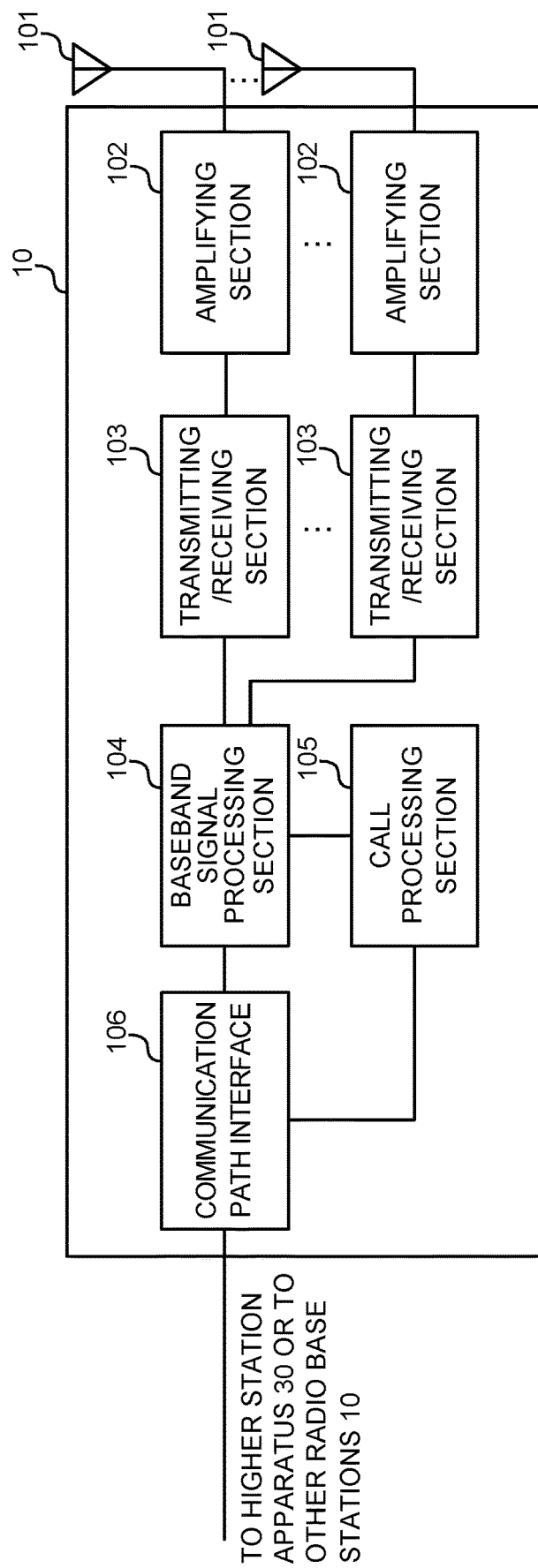
FIG. 6 is a diagram to show an example of an overall structure of a radio base station according to one embodiment of the present invention.

FIG. 6 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 transmit a transmission indication (for example, a UL grant) of an uplink shared channel (PUSCH) using a certain number of symbols (for example, one symbol), and also receive a PUSCH transmitted from the UE. The transmitting/receiving sections 103 transmit at least one of an allocation type (mapping type) employed for PUSCH transmission, information related to a waveform employed for PUSCH transmission, and information related to a PUSCH start symbol and a PUSCH length.

Figure 7:
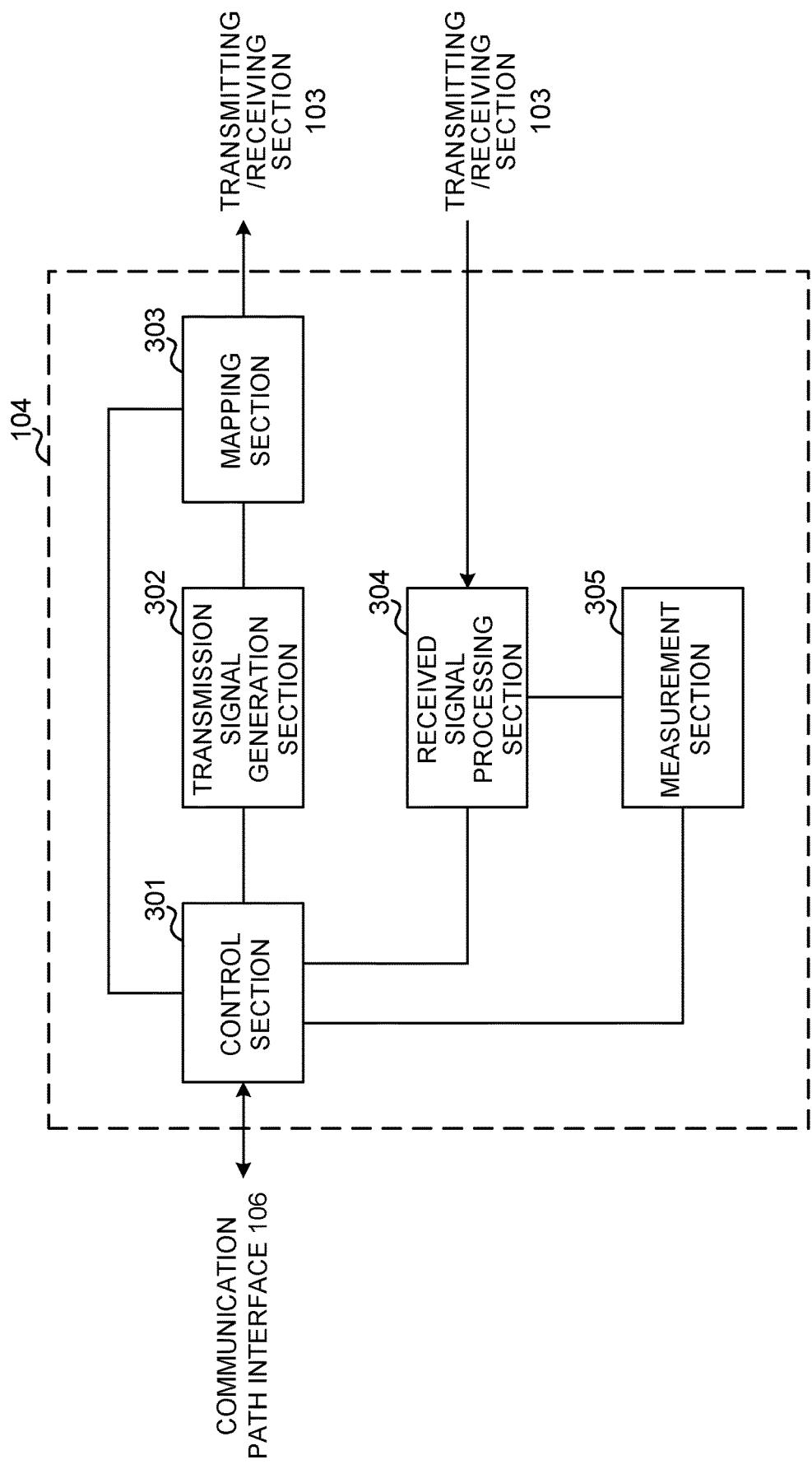
FIG. 7 is a diagram to show an example of a functional structure of the radio base station according to one embodiment of the present invention.

FIG. 7 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH and/or an EPDCCH, delivery confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, a PSS (Primary Synchronization Signal)/an SSS (Secondary Synchronization Signal)), a downlink reference signal (for example, a CRS, a CSI-RS, a DMRS), and so on.

The control section 301 controls scheduling of an uplink data signal (for example, a signal transmitted on a PUSCH), an uplink control signal (for example, a signal transmitted on a PUCCH and/or a PUSCH, delivery confirmation information, and so on), a random access preamble (for example, a signal transmitted on a PRACH), an uplink reference signal, and so on.

When one-symbol PUSCH transmission is performed by employing the DFT spread OFDM waveform (first waveform) for the PUSCH, the control section 301 may perform a receiving process (for example, at least one of a demodulation process, a decoding process, and a channel estimation process) for the one-symbol PUSCH by using a DMRS transmitted from the UE before the one-symbol PUSCH.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

User Terminal

Figure 8:
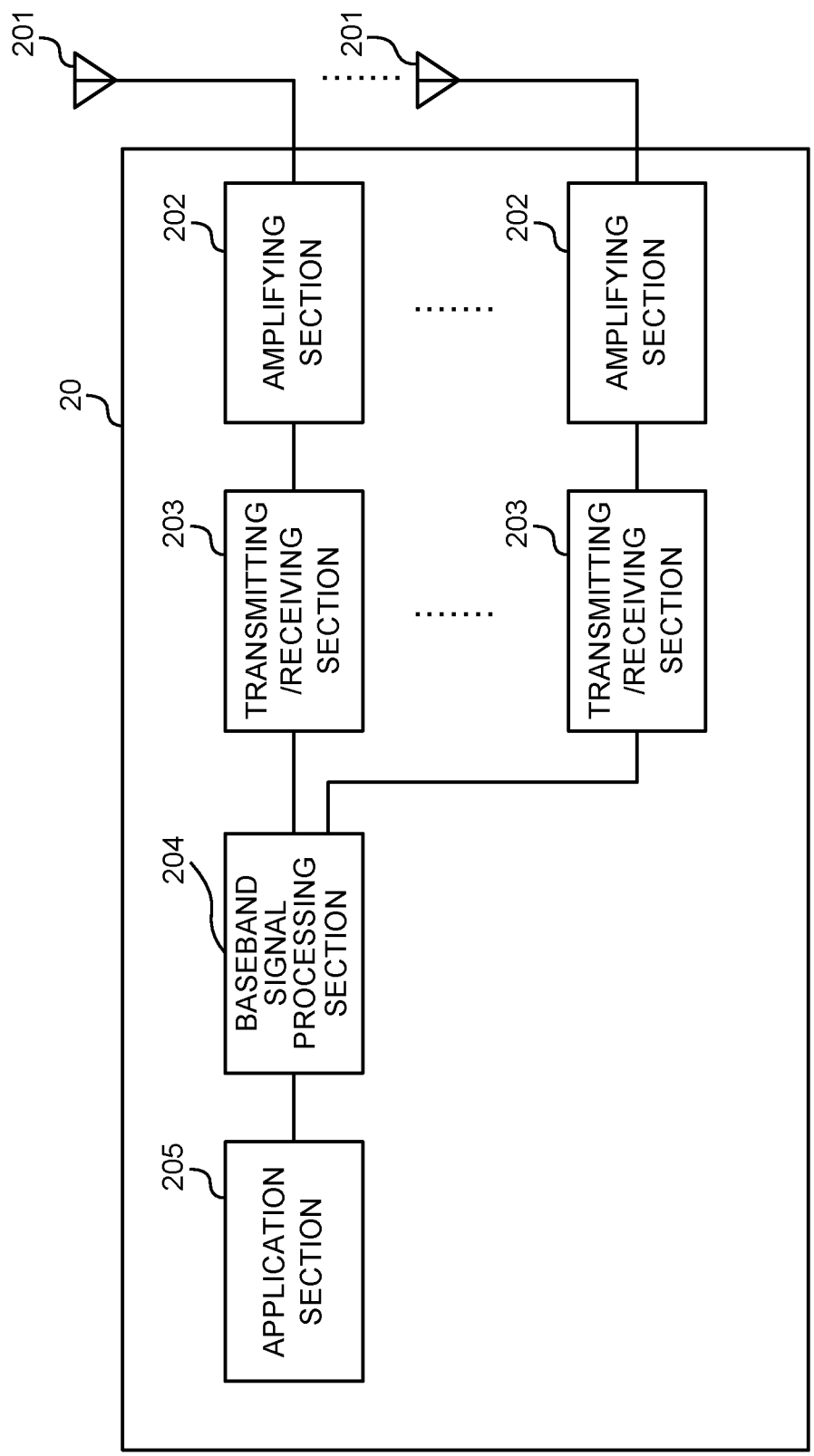
FIG. 8 is a diagram to show an example of an overall structure of a user terminal according to one embodiment of the present invention.

FIG. 8 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 receive a transmission indication (for example, a UL grant) of an uplink shared channel (PUSCH) using a certain number of symbols (for example, one symbol), and also performs PUSCH transmission using one symbol. The transmitting/receiving sections 203 receive at least one of an allocation type (mapping type) employed for PUSCH transmission, information related to a waveform employed for PUSCH transmission, and information related to a PUSCH start symbol and a PUSCH length.

Figure 9:
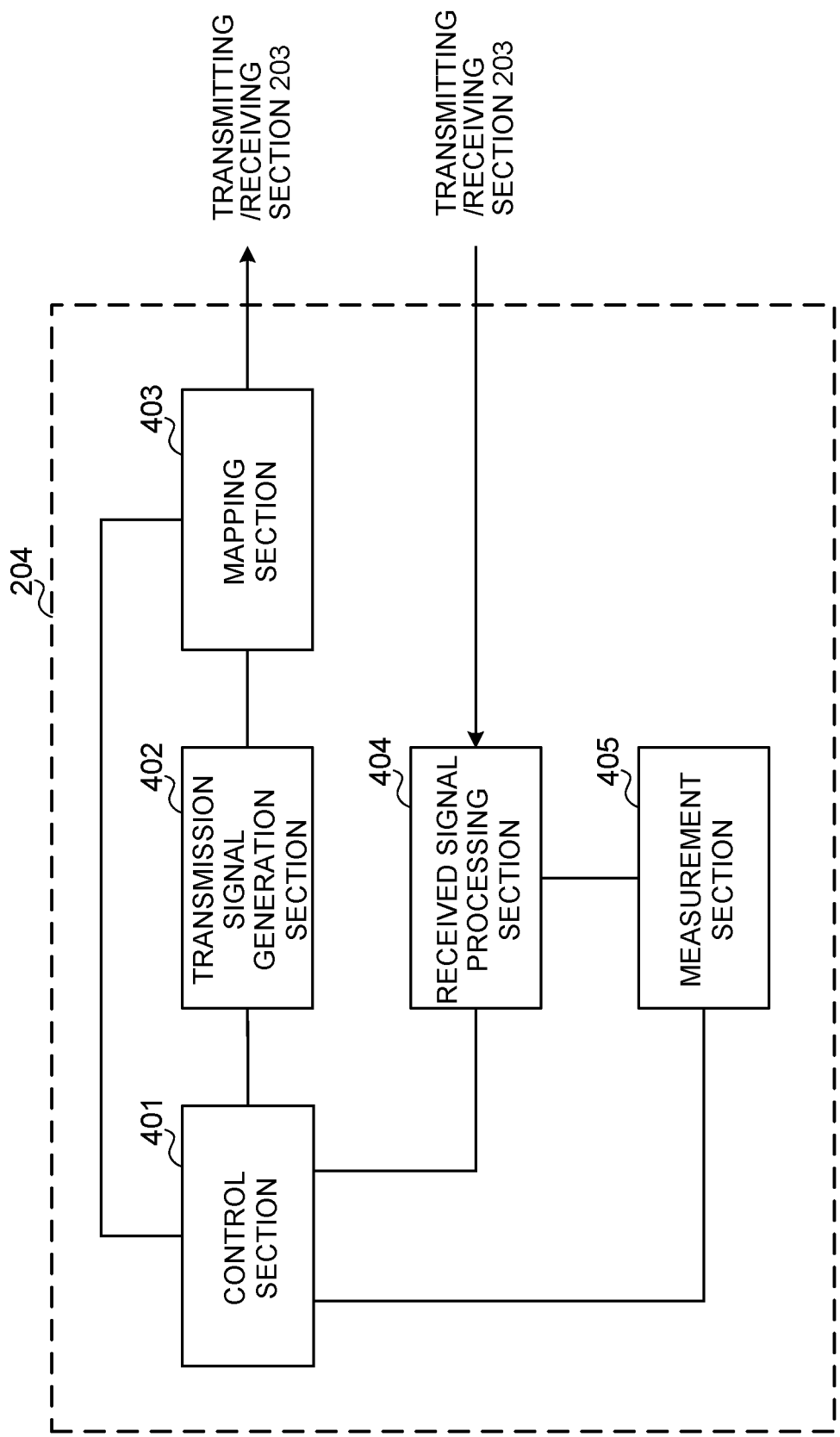
FIG. 9 is a diagram to show an example of a functional structure of the user terminal according to one embodiment of the present invention.

FIG. 9 is a diagram to show an example of a functional structure of a user terminal according to one embodiment of the present invention. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

In a case that a plurality of allocation types for a time direction of a PUSCH are supported, the control section 401 performs control such that PUSCH transmission using one symbol is performed when an allocation type (for example, type B) allowing a change of the PUSCH start position is employed.

In a case that configuration as to whether or not the first waveform being the DFT spread OFDM waveform is employed for the PUSCH is supported, the control section 401 may perform control such that PUSCH transmission using one symbol is performed when the first waveform is not configured. In the configuration that PUSCH transmission is controlled by using tables in which a plurality of candidates corresponding to a start position and a length of the PUSCH are defined, different candidates (for example, candidates having different PUSCH lengths) may be defined for a table for the case where the first waveform is employed and a table for the case where the first waveform is not employed.

Alternatively, when the first waveform being the DFT spread OFDM waveform is employed for the PUSCH, the control section 401 may perform control such that PUSCH transmission using one symbol is performed without transmitting a DMRS.

When PUSCH transmission using one symbol is performed, the control section 401 may perform control such that one of uplink data and uplink control information is allocated for the PUSCH.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about delivery confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

Hardware Structure

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 10:
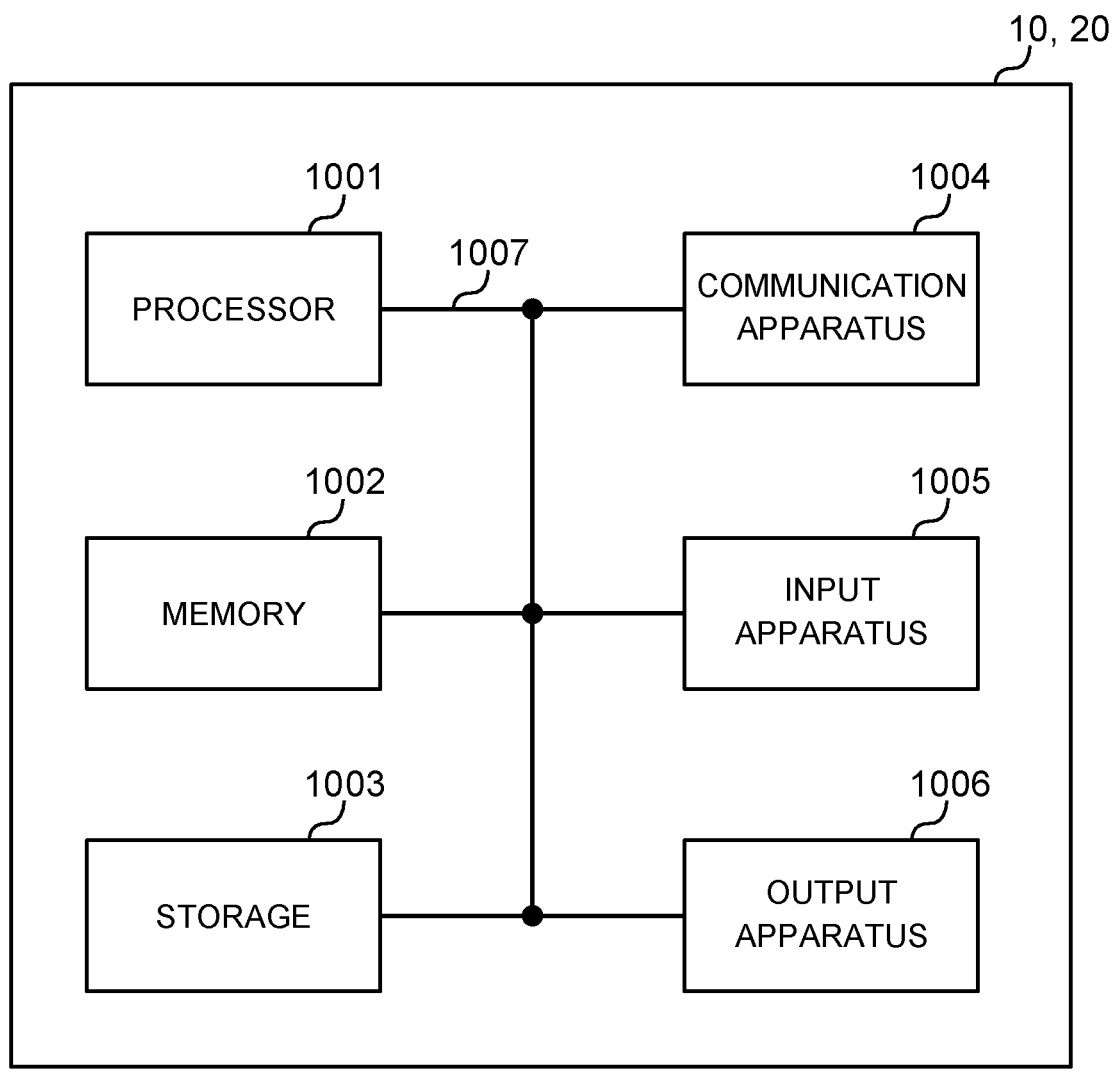
FIG. 10 is a diagram to show an example of a hardware structure of the radio base station and the user terminal according to one embodiment of the present invention.

For example, a radio base station, a user terminal, and so on according to one embodiment of the present invention may function as a computer that executes the processes of the radio communication method of the present invention. FIG. 10 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals),"  "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
a receiver that receives information regarding an allocation type of an uplink shared channel; and
a processor that controls a start symbol and a number of consecutive symbols of the uplink shared channel,
wherein, when the receiver receives a first allocation type as the information regarding the allocation type of the uplink shared channel, the processor determines an index of the start symbol of the uplink shared channel as 0, and determines the number of consecutive symbols of the uplink shared channel based on higher layer signaling and downlink control information,
when the receiver receives a second allocation type as the information regarding the allocation type of the uplink shared channel, the processor determines the start symbol and the number of consecutive symbols of the uplink shared channel by allowing the start symbol of the uplink shared channel to be changed to any symbol in a slot, in which the uplink shared channel is allocated, and determines the start symbol and the number of consecutive symbols of the uplink shared channel based on higher layer signaling and downlink control information,
when the receiver receives the first allocation type as the information regarding the allocation type of the uplink shared channel, the processor controls not to support transmission of the uplink shared channel using one symbol, and
when the receiver receives the second allocation type as the information regarding the allocation type of the uplink shared channel, the processor controls to support transmission of the uplink shared channel using one symbol.

2. The terminal according to claim 1, wherein a position of a demodulation reference signal (DMRS) for use in demodulation of the uplink shared channel is determined based on the first allocation type included in the information or the second allocation type included in the information.

3. A radio communication method for a terminal comprising:
receiving information regarding an allocation type of an uplink shared channel; and
controlling a start symbol and a number of consecutive symbols of the uplink shared,
wherein, when a first allocation type is received as the information regarding the allocation type of the uplink shared channel, determining an index of the start symbol of the uplink shared channel as 0, and determining the number of consecutive symbols of the uplink shared channel based on higher layer signaling and downlink control information,
when a second allocation type is received as the information regarding the allocation type of the uplink shared channel, determining the start symbol and the number of consecutive symbols of the uplink shared channel by allowing the start symbol of the uplink shared channel to be changed to any symbol in a slot, in which the uplink shared channel is allocated, and determining the start symbol and the number of consecutive symbols of the uplink shared channel based on higher layer signaling and downlink control information,
when the first allocation type is received as the information regarding the allocation type of the uplink shared channel, controlling not to support transmission of the uplink shared channel using one symbol, and
when the second allocation type is received as the information regarding the allocation type of the uplink shared channel, controlling to support transmission of the uplink shared channel using one symbol.

4. A base station comprising:
a transmitter that transmits information regarding an allocation type of an uplink shared channel for indicating a start symbol and a number of consecutive symbols of the uplink shared channel; and
a receiver that receives the uplink shared channel, in which the start symbol and the number of consecutive symbols of the uplink shared channel are controlled based on the information regarding the allocation type of the uplink shared channel, wherein, when the transmitter transmits a first allocation type as the information regarding the allocation type of the uplink shared channel, the receiver receives the uplink shared channel, in which an index of the start symbol of the uplink shared channel is determined as 0, and the number of consecutive symbols of the uplink shared channel is determined based on higher layer signaling and downlink control information, when the transmitter transmits a second allocation type as the information regarding the allocation type of the uplink shared channel, the receiver receives the uplink shared channel, in which the start symbol of the uplink shared channel is allowed to be changed to any symbol in a slot, in which the uplink shared channel is allocated, and so that the start symbol and the number of consecutive symbols of the uplink shared channel are determined based on higher layer signaling and downlink control information, when the transmitter transmits the first allocation type as the information regarding the allocation type of the uplink shared channel, the receiver does not support reception of the uplink shared channel using one symbol, and when the transmitter transmits the second allocation type as the information regarding the allocation type of the uplink shared channel, the receiver supports reception of the uplink shared channel using one symbol.

5. A system comprising a base station and a terminal, wherein:

the base station comprises:
a transmitter that transmits information regarding an allocation type of an uplink shared channel for indicating a start symbol and a number of consecutive symbols of the uplink shared channel, and the terminal comprises:
a receiver that receives the information regarding the allocation type of the uplink shared channel; and
a processor that controls the start symbol and the number of consecutive symbols of the uplink shared channel, wherein, when the receiver receives a first allocation type as the information regarding the allocation type of the uplink shared channel, the processor determines an index of the start symbol of the uplink shared channel as 0, and determines the number of consecutive symbols of the uplink shared channel based on higher layer signaling and downlink control information, when the receiver receives a second allocation type as the information regarding the allocation type of the uplink shared channel, the processor determines the start symbol and the number of consecutive symbols of the uplink shared channel by allowing the start symbol of the uplink shared channel to be changed to any symbol in a slot, in which the uplink shared channel is allocated, and determines the start symbol and the number of consecutive symbols of the uplink shared channel based on higher layer signaling and downlink control information, when the receiver receives the first allocation type as the information regarding the allocation type of the uplink shared channel, the processor controls not to support transmission of the uplink shared channel using one symbol, and when the receiver receives the second allocation type as the information regarding the allocation type of the uplink shared channel, the processor controls to support transmission of the uplink shared channel using one symbol.

* * * * *